(12) United States Patent
Hanabusa (10) Patent No.: US 9,100,523 B2
(45) Date of Patent: Aug. 4, 2015

(54) IMAGE FORMING APPARATUS COMPRISING A SHEET FEEDING DEVICE AND AN IMAGE READING DEVICE

(75) Inventor: Tadashi Hanabusa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/443,288

(22) Filed: Apr. 10, 2012

(65) Prior Publication Data

US 2012/0262746 A1 Oct. 18, 2012

(30) Foreign Application Priority Data

Apr. 14, 2011 (JP) .................................. 2011-090370

(51) Int. Cl.
| | |
|---|---|
| H04N 1/00 | (2006.01) |
| H04N 1/12 | (2006.01) |
| G06K 15/16 | (2006.01) |
| H04N 1/047 | (2006.01) |
| B65H 7/04 | (2006.01) |

(52) U.S. Cl.
CPC ............. *H04N 1/00588* (2013.01); *B65H 7/04* (2013.01); *H04N 1/0062* (2013.01); *H04N 1/00602* (2013.01); *H04N 1/00689* (2013.01); *H04N 1/00692* (2013.01); *H04N 1/00694* (2013.01); *H04N 1/00734* (2013.01); *H04N 1/00745* (2013.01); *H04N 1/00755* (2013.01); *H04N 1/00774* (2013.01); *H04N 1/0473* (2013.01); *B65H 2511/51* (2013.01); *B65H 2513/40* (2013.01); *B65H 2513/512* (2013.01); *H04N 2201/0471* (2013.01); *H04N 2201/04725* (2013.01); *H04N 2201/04731* (2013.01)

(58) Field of Classification Search
CPC ...... G06K 15/16; H04N 1/0057; H04N 1/121
USPC .................................................. 358/496, 498
See application file for complete search history.

(56) References Cited

U.S. PATENT DOCUMENTS 6,999,211 B2 * 2/2006 Sekiya et al. ................. 358/498

FOREIGN PATENT DOCUMENTS

| JP | S61-257839 A | 11/1986 |
|---|---|---|
| JP | H05-085630 A | 4/1993 |
| JP | 409301572 A | * 11/1997 |
| JP | 10-186996 A | 7/1998 |

* cited by examiner

*Primary Examiner* — Eric A Rust
(74) *Attorney, Agent, or Firm* — Canon U.S.A. Inc., IP Division

(57) ABSTRACT

A sheet feeding apparatus includes a sheet feeding unit configured to feed stacked sheets, a detection unit configured to detect, from a side opposite the sheet feeding unit, sheet movement with respect to the stacked sheets, and a determination unit configured to determine that a sheet being fed by the sheet feeding unit is a last sheet.

9 Claims, 9 Drawing Sheets

IMAGE FORMING APPARATUS COMPRISING A SHEET FEEDING DEVICE AND AN IMAGE READING DEVICE

BACKGROUND OF THE INVENTION

1. Field of the Invention

The present invention relates to an image reading and forming apparatus including a reading unit that reads out an image of a document, and an image forming unit that records the image on a recording sheet.

2. Description of the Related Art

In an image forming apparatus equipped with a document reading device discussed in Japanese Patent Application Laid-Open No. 10-186996, presence of documents is detected near trailing edges of set documents, and it is determined whether a document to be sent out is a final document. Based on this determination result, the image forming apparatus is configured to control whether to perform advance feeding of a recording sheet. In other words, if absence of a document is detected by a detection unit after the document has been sent out, this document can be determined to be the final document, and the advance feeding of the recording sheet corresponding to a next document is stopped by a control unit. In this manner, the advance feeding of unnecessary recording sheet is prevented.

The configuration discussed in Japanese Patent Application Laid-Open No. 10-186996 includes a tray with a length the same as a maximum document size. Further, the configuration includes trailing edge detection sensors arranged for each document size, which results in an increased manufacturing cost. Furthermore, with respect to documents other than standard form sizes, a delay time arises before detection is carried out, which results in a delay in starting a recording operation.

SUMMARY OF THE INVENTION

One aspect of the present invention provides an image reading and forming apparatus capable of detecting at once whether a paper bundle includes singular or plural recording media immediately after an operation starts regardless of the document size while not increasing the size and lowering the cost of the image reading and forming apparatus.

According to an aspect of the present invention, an image reading and forming apparatus includes a document feeding unit that feeds a at least one sheet from sheet-like documents set on a mounting unit, a reading unit that reads images of documents fed by the document feeding unit, a sheet feeding roller that feeds the at least one sheet, a recording unit that records images, according to image information, read by the reading unit on the at least one sheet fed by the feed roller, a detection unit that detects, from a side opposite to the sheet feeding unit, a document movement amount with respect to the set documents, and a control unit that stops feeding, by the feed roller, based on the detection by the detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
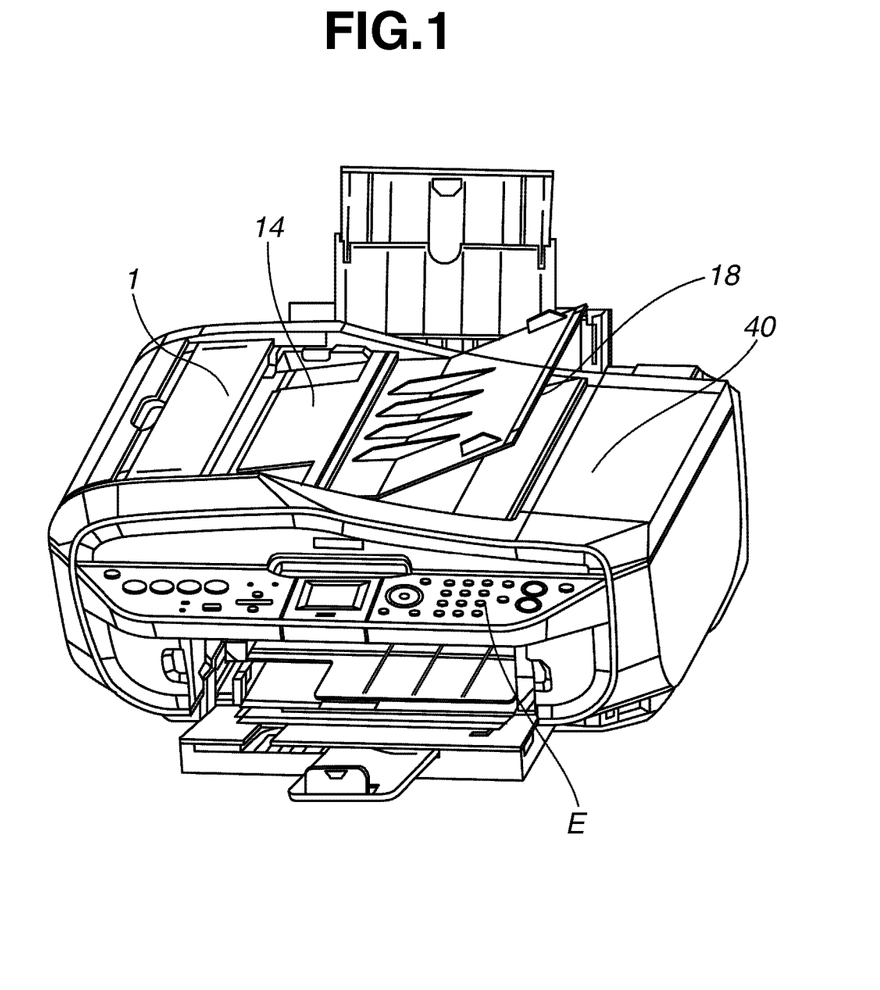
FIG. 1 is an external perspective view of an inkjet printer according to an exemplary embodiment of the present invention.
Figure 2A:
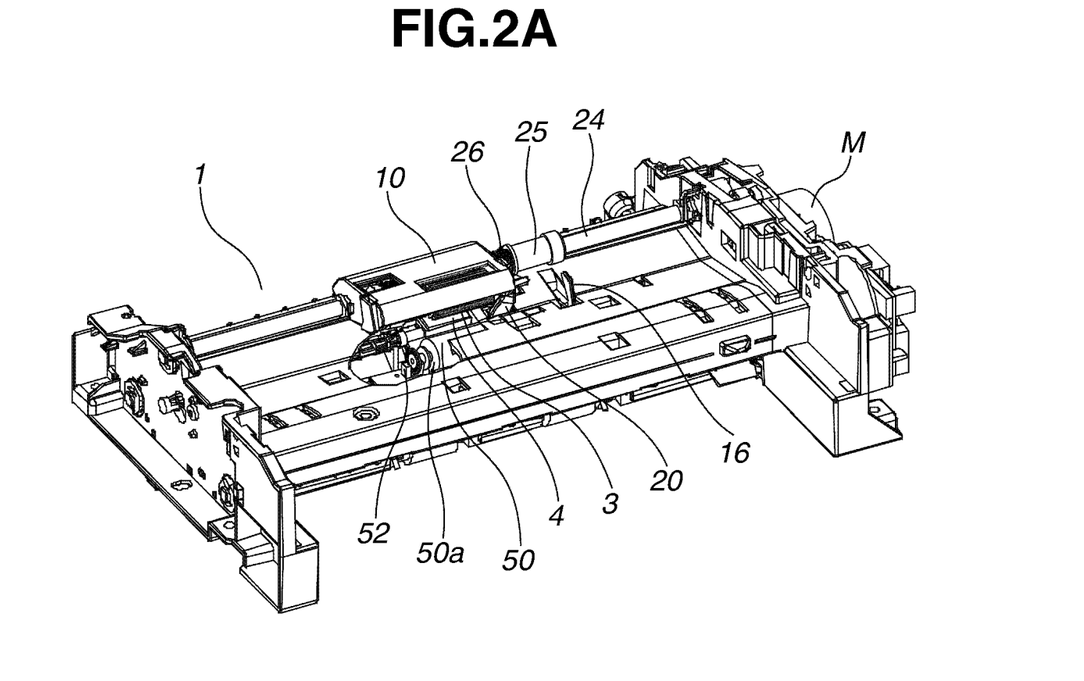
FIGS. 2A and 2B are perspective views illustrating a document pickup unit of the inkjet printer according to an exemplary embodiment of the present invention.
Figure 2B:
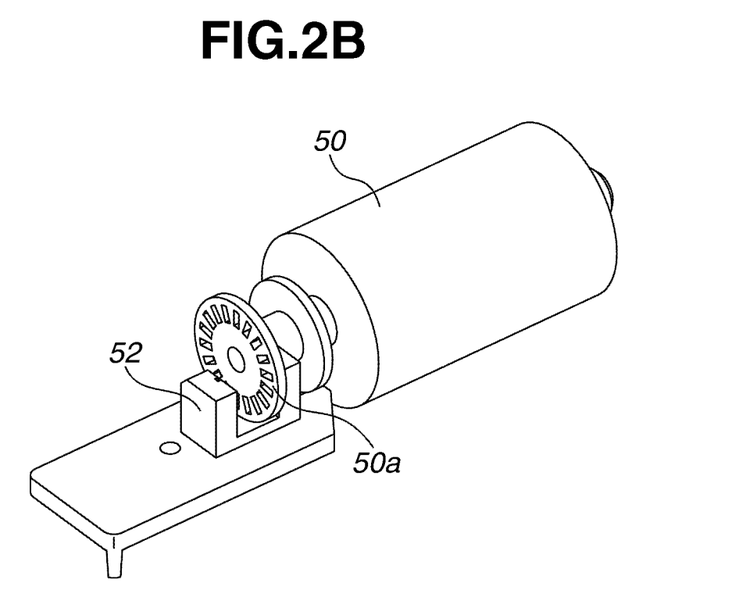
Figure 3:
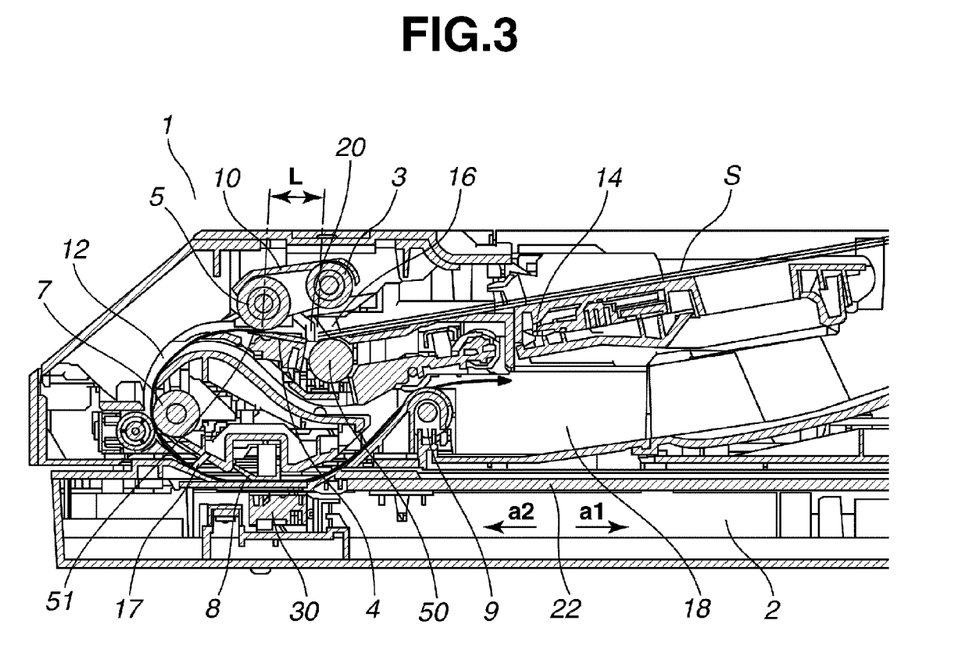
FIG. 3 is a cross-sectional view of a reading unit of the inkjet printer according to an exemplary embodiment of the present invention.
Figure 4:
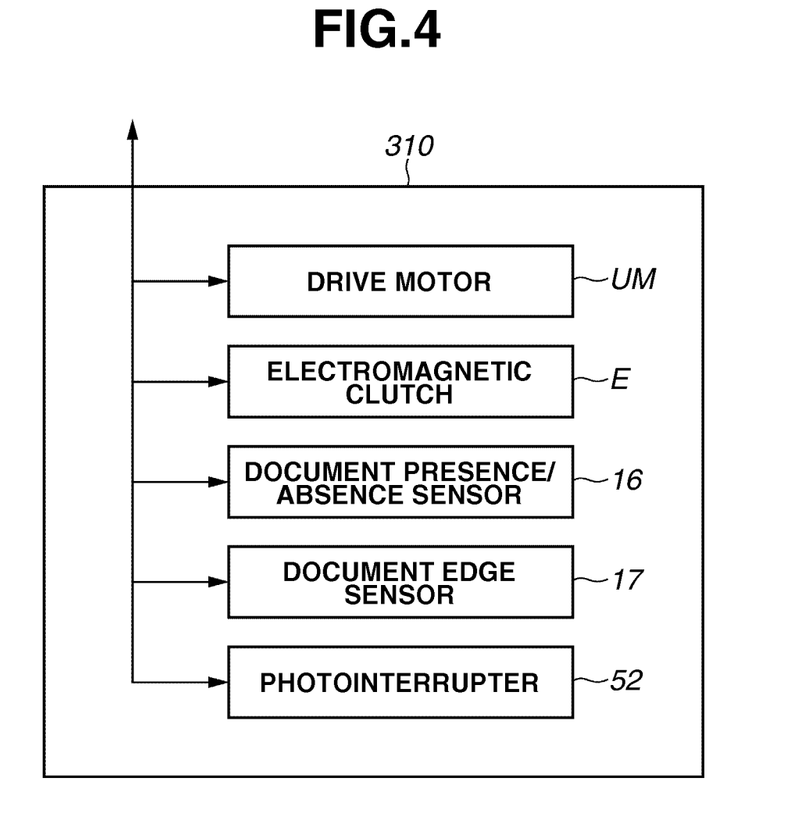
FIG. 4 illustrates a circuit configuration of a document conveying and reading unit.

FIG. 1 is an external perspective view illustrating a document reading and recording apparatus according to an exemplary embodiment. FIG. 2 is a perspective view illustrating a document pickup unit of the document reading and recording apparatus according to the present exemplary embodiment. FIG. 3 is a cross-sectional view illustrating from a front side a document conveying and reading unit of the document reading and recording apparatus according to the present exemplary embodiment. FIG. 4 illustrates a circuit configuration of the document conveying and reading unit.

First, a configuration and operation of a document conveying and reading unit 1 will be described with reference to FIG. 1 to FIG. 4. In the document conveying and reading unit 1, a U-shaped document conveyance path (hereinafter, referred to as a U-turn path) 12 that conveys a sheet-shaped document S is provided as a document conveyance device. A separation roller 5 and a separation pad 4, a document presence/absence sensor 16 that detects presence of the document S, a first conveyance roller 7 that conveys the document S, and a document edge sensor 17 that detects a leading edge and trailing edge of the document S are arranged on the U-turn path 12.

In the document conveying and reading unit 1, to an upstream end side of the U-turn path 12, a document placing tray 14 is connected and provided as a document placing portion on which the stack documents S with a plurality of sheets are loaded. Further, on a downstream end side of the U-turn path 12, there are provided a document pressing plate 40 (hereinafter, referred to as a pressing plate 40) that presses and secures the documents during flat bed scanning, and a document discharge tray 18 integrally formed with the pressing plate 40.

On the upstream end side of the U-turn path 12, a document stopper 20 is provided that regulates a leading edge position of the documents S stacked on the document placing tray 14. Furthermore, on the upstream end side of the U-turn path 12, there is provided a pickup roller 3 serving as a document feeding unit or a document feeding roller that abuts on an uppermost loaded document S to pull out the document S.

On a side opposite to the pickup roller 3 with respect to the document S, a document movement amount detection sensor 50 serving as a movement amount detection unit (motion sensor) is provided that detects a movement amount of the document. The document movement amount detection sensor 50 is a rotating member and an outer circumference surface thereof is made of rubber or elastomer or the like, and is configured to generate frictional force between the document and itself. The outer circumference surface of the rotating member contacts a side opposite to a face of the set documents or document bundle which the pickup roller 3 contacts.

Furthermore, a disk-shaped code wheel 50a is fixed to a rotary shaft of the rotating member to rotate in synchronization with the rotating member. A rotation amount can be detected when a photointerrupter 52 counts a slit 50b provided on a concentric circle of the code wheel 50a. The slit 50b may be a mark readable with an optical sensor. A movement amount of the last document is detected by detecting the rotation amount.

The documents S fed out by the pickup roller 3 are separated one by one by a separation roller 5 and a separation pad 4 serving as a separation unit arranged on the upstream end side of the U-turn path 12. The separation roller 5 and a separation pad 4 press contact each other. Further, on the downstream end side of the U-turn path 12, a second conveyance roller 9 for discharging the documents S to a document discharge tray 18 is provided.

In the present exemplary embodiment, a fixed reading unit (flat bed scanner) 2 is provided as a reading unit that reads out the documents placed and fixed on a document reading face of a flat bed glass 22. The fixed reading unit 2 includes a contact type image sensor 30 serving as a document reading unit, and is arranged opposing the document conveying and reading unit 1 across the flat bed glass 22. The contact type image sensor 30 irradiates an image information surface of the documents S with light from a light-emitting diode (LED) array serving as a light source. The contact type image sensor 30 focuses light reflected on the image information surface to form an image on a sensor element with self-focusing type rod lens array and reads out image information.

The contact type image sensor 30 is movably supported in directions indicated by arrows a1 and a2 in FIG. 3. During reading operation of the document S placed and fixed on a reading surface on the flat bed glass 22 (during flat bed scanning operation), the contact type image sensor 30 reads out the document S while scanning in the arrow a1 direction in FIG. 3. In a case where the document is read out by the document conveying and reading unit 1, the contact type image sensor 30 is at rest at a reading position (opposed position to a white background plate 8 for reading) as illustrated in FIG. 3, and the contact type image sensor 30 reads out the document conveyed to this reading position.

The user sets the documents S on the document conveying and reading unit 1 in the arrow a2 direction from right side towards left side in FIG. 3. The documents S are placed on the document placing tray 14 so that the leading edge hits the document stopper 20. The documents are set with image surfaces upward. At the time of this document setting, leading edge positions of the documents S are regulated by the document stopper 20, and presence of the documents S is detected by the document presence/absence sensor 16.

Next, a driving system is described. A driving force from a drive motor M is transmitted to the separation roller 5, the pickup roller 3, a first conveyance roller 7, and a second conveyance roller 9 via a gear or a belt (not-illustrated). The separation roller 5 and the pickup roller 3 are connected via an electromagnetic clutch EC. The driving force from the drive motor can be transmitted to the separation roller 5 and the pickup roller 3, or cut off. The pickup roller 3, the separation roller 5, the first conveyance roller 7, and the second conveyance roller 9 are connected by a drive train (not illustrated). When the drive motor M is rotated forward, the pickup roller 3 and the separation roller 5 rotate clockwise in FIG. 3, while the first conveyance roller 7 and the second conveyance roller 9 rotate counterclockwise in FIG. 2.

When an operator sets a document copying mode from an operation unit E and gives an instruction to start reading of the documents, the drive motor M rotates forward. At this time, the electromagnetic clutch EC is connected to drive a separation roller shaft 24. Between a clutch hub 25 fixed to the separation roller shaft 24 and a pickup arm 10, a clutch spring 26 serving as a compression spring is arranged, and the pickup arm 10 is frictionally retained by a frictional force F induced by a pressing force of this clutch spring 26.

When the drive motor M rotates forward, the separation roller shaft 24 also rotates forward (rotates clockwise in FIG. 3), and the pickup roller 3 is pressed against the documents S by the pickup arm 10 receiving the frictional force F transmitted from the clutch hub 25. At this time, the pickup roller 3, the separation roller 5, the second conveyance roller 9, and the first conveyance roller 7 are connected by the drive train (not illustrated) so that the three rollers 3, 5 and 9 rotate clockwise in FIG. 3 while the roller 7 rotates counterclockwise.

The documents S are sent into the inside of the U-turn path 12 by the rotation of the pickup roller 3. At this time, in the document conveying and reading unit 1, the documents S are separated one by one by the separation roller 5 and the separation pad 4, and only the uppermost document S is separated and conveyed.

As described above, since the pickup roller 3 is pressed by the documents S, the documents S are also pressed against the document movement amount detection sensor 50. When the document abutting on the document movement amount detection sensor 50 moves, the document movement amount detection sensor 50 moves (rotates) together with the document by the friction therebetween. In other words, when two or more documents are set, documents other than the uppermost document S cannot move ahead of a nip portion 51 between the separation roller 5 and the separation pad 4 at the time of document pickup. Therefore, a movement amount is limited, and a document movement amount detected by the document movement amount detection sensor 50 does not exceed a distance L from the leading edge position of the document regulated by the document stopper 20 to the nip portion 51 of the separation roller 5 and the separation pad 4. If only one sheet of document is set, the document leading edge moves beyond the nip portion 51 between the separation roller 5 and the separation pad 4, with the result that the movement amount becomes greater than L.

Then, the separated document S is conveyed along the U-turn path 12, and further, the document S is conveyed by the first conveyance roller 7 to the reading unit which reads the document with the contact type image sensor 30. By cutting off the drive of the electromagnetic clutch EC at this timing, the next document S is not fed until the drive of the electromagnetic clutch EC is again connected.

In the document conveying and reading unit 1, when the leading edge of the document S is detected by the document edge sensor 17, reading of image information of the document surface by the contact type image sensor 30 is started at a location to which the document C has been conveyed by a predetermined amount from the detecting position, while the document S is being conveyed. Then, when the trailing edge of the document S is detected by the document edge sensor 17, the reading of the image information by the contact type image sensor 30 is completed, at a location to which the document has been conveyed by the predetermined amount from the detecting position. After that, the document is fed again by connecting the drive of the electromagnetic clutch EC.

Figure 5:
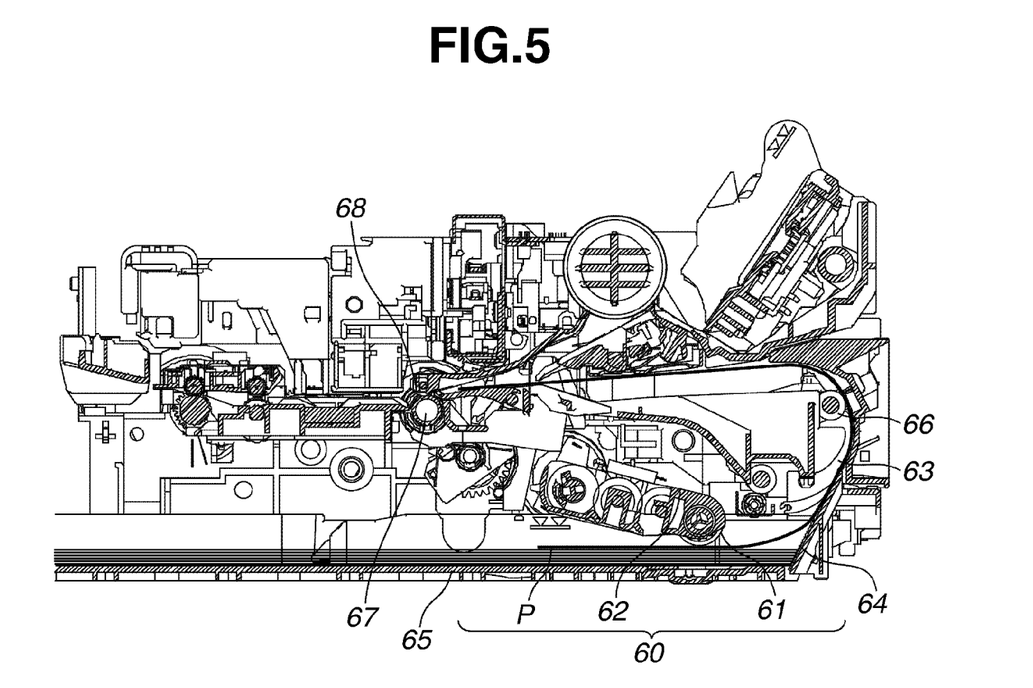
FIG. 5 is a cross-sectional view of a recording sheet conveyance unit of the inkjet printer according to an exemplary embodiment of the present invention.

FIG. 5 is a cross-sectional view illustrating from lateral side a recording sheet conveyance unit of the image reading and forming apparatus according to the present exemplary embodiment. A configuration and operation of a U-turn sheet feeding device 60 serving as a recording sheet conveyance unit will be described. As illustrated in FIG. 5, the U-turn sheet feeding device 60 serving as the image forming device includes a U-turn sheet loading portion 65 that loads the recording sheets P, and a U-turn sheet feeding roller 61 serving as a sheet feeding unit or a sheet feeding roller that feeds the sheets P.

The U-turn sheet feeding roller 61 is supported by a U-turn sheet feeding arm 62. Furthermore, the U-turn sheet feeding device 60 includes a U-turn separation portion 64 that separates the sheet material P which has been fed, and a U-turn sheet path 63 through which the fed sheet material P passes. Further, in the U-turn sheet path 63, a U-turn intermediate roller 66 is disposed that drives and conveys the sheet which has been fed from the U-turn sheet feeding roller 61 toward a nip portion between an LF roller 67 and a pinch roller 68.

Figure 6:
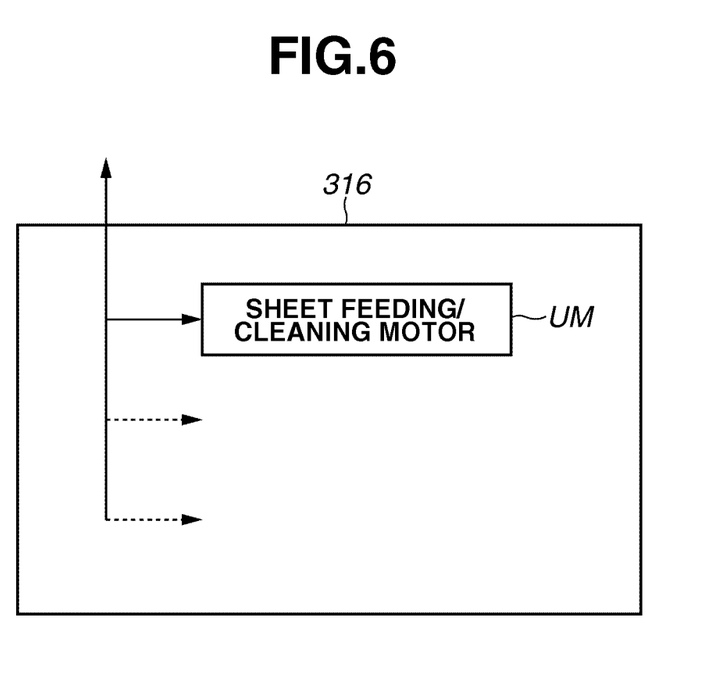
FIG. 6 is a circuit diagram of a printer engine.

To the U-turn sheet feeding roller 61, and the U-turn sheet feeding arm 62, the drive is transmitted via a transmission unit including a gear clutch mechanism (not illustrated) from a sheet feeding/cleaning motor UM of a printer engine 316 illustrated in FIG. 6. The gear clutch mechanism is switched to three positions. More specifically, the mechanism is switched to a position for transmitting the drive from the sheet feeding/cleaning motor UM to the U-turn sheet feeding roller 61, a position for transmitting the drive to a cleaning unit, or an intermediate position for transmitting no drive to wither of them.

On a downstream side in a conveyance direction of the U-turn sheet feeding roller 61, a U-turn intermediate roller 66 serving as a conveyance roller is arranged. In this case, the drive is transmitted from the motor UM to the U-turn intermediate roller 66 so that the drive is always connected without using the clutch, since conveyance accuracy of the recording sheet P is unfavorably influenced if the sheet is driven and conveyed by the U-turn intermediate roller 66 via a clutch. Further, drive switching among three positions is performed immediately before feeding of the recording sheet, or between pages in the recording, since the conveyance accuracy of the recording sheets is unfavorably influenced by the intermediate roller, if the drive switching is performed during the recording operation.

A sheet conveyance speed of the U-turn intermediate roller 66 is faster than a sheet conveyance speed of the U-turn sheet feeding roller 61. In a case where the recording sheets are successively fed, the motor UM is successively driven while the drive train from the motor UM remains connected to the U-turn sheet feeding roller 61. Owing to a difference of circumferential speeds between the intermediate roller 66 and the sheet feeding roller 61, and a mechanical timer (overrunning mechanism) provided in the drive train of the U-turn sheet feeding roller 61, intervals between the recording sheets successively fed become uniform.

Figure 9A:
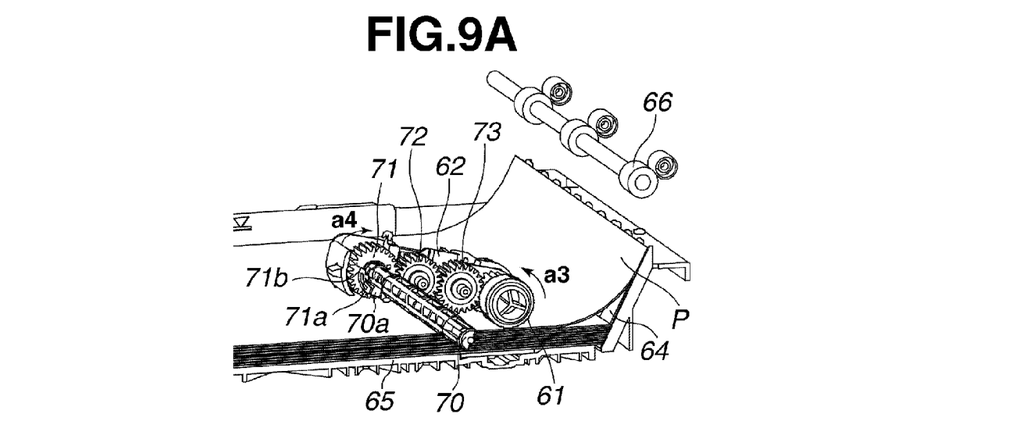
FIGS. 9A, 9B and 9C are perspective views of a recording sheet feeding unit of the inkjet printer according to an exemplary embodiment of the present invention.
Figure 9B:
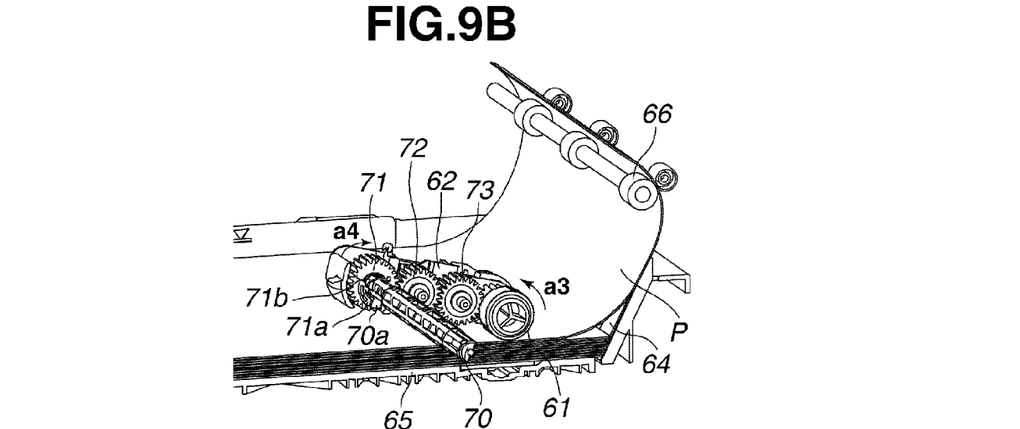
Figure 9C:
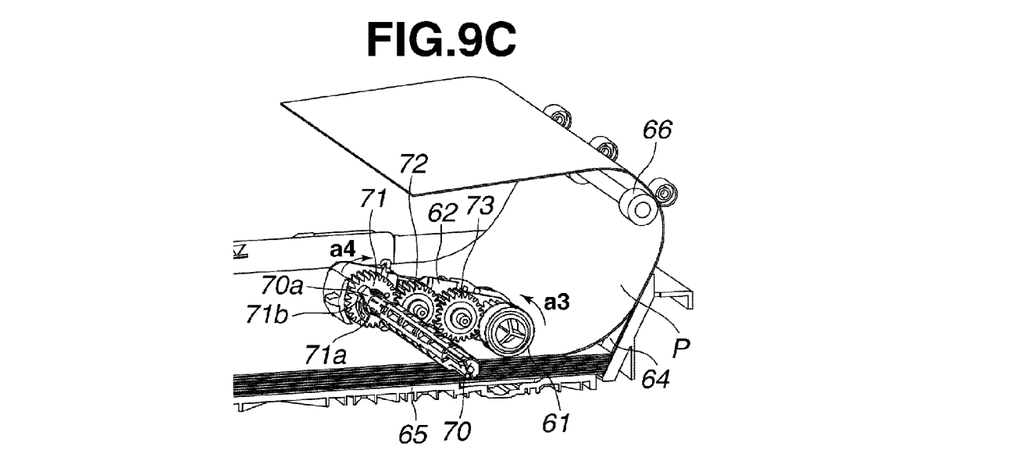

Here, more detailed descriptions will be presented with reference to FIGS. 9A to 9C. When the drive is transmitted to a gear shaft 70 via the drive train from the motor UM, the gear shaft 70 serving as a rotating member on the drive side rotates clockwise in FIG. 9A. Then, a protruding portion 70a serving as a first engaging portion abuts on a rib end portion 71a (second engaging portion) of a drive gear 71 serving as a rotating member on a driven side to transmit a rotation in an arrow a4 direction. The protruding portion 70a serving as the first engaging portion and the rib end portion 71a serving as the second engaging portion constitute an overrunning mechanism, and the U-turn sheet feeding roller 61 is permitted to rotate faster than rotation by a transmitted drive.

Then, the drive is transmitted to the sheet feeding roller 61 via an intermediate gear 72, and an intermediate gear 73, and the sheet feeding roller 61 rotates counterclockwise (a3 direction) to feed out the sheet P. Only the uppermost sheet is separated and conveyed by the separation portion 64, toward the intermediate roller 66. In this process, while the drive is transmitted to the intermediate roller 66 and the sheet feeding roller 61 via a plurality of gears from the same driving source, the circumferential speed of the intermediate roller 66 is set faster than the circumferential speed of the sheet feeding roller 61. Therefore, after the sheet P has reached the intermediate roller 66, conveyance of the sheet P is carried out by the intermediate roller 66 with faster circumferential speed.

Although the sheet feeding roller 61 subsequently driven abuts on the sheet P, movement of the sheet P is faster than the circumferential speed of the sheet feeding roller 61 (FIG. 9B). As a result, the sheet feeding roller 61 is rotated at the same speed as the sheet due to friction with the sheet. Then, the drive is transmitted to the drive gear 71, and the rib end portion 71a of the drive gear 71 and the protruding portion 70a of the gear shaft 70 move apart from each other due to the speed difference. Then, the protruding portion 70a of the gear shaft 70 abuts on the rib end portion 71b on the opposite side of the drive gear 71. Thereafter, due to the circumferential speed difference, the sheet P is conveyed in a state where a slip is occurring between the sheet feeding roller 61 and the sheet P (FIG. 9C).

After that, when conveyance of the sheet P further continues, a trailing edge of the fed sheet P passes through the sheet feeding roller 61, and the next recording sheet P abuts on the sheet feeding roller 61. Since the drive from the motor UM is transmitted continuously to the gear shaft 70, the gear shaft 70 runs idle without transmitting the drive to the sheet feeding roller 61 until the protruding portion 70a of the gear shaft 70 abuts on the rib end portion 71a of the drive gear 71 being at rest. All that time, the first sheet continues to be conveyed by the intermediate roller 66. Therefore, before the next recording sheet is fed out, delay of conveyance corresponding to an amount of idling occurs with respect to a distance between a trailing edge of the first sheet and a leading edge of the second sheet. Therefore, the next recording sheet is successively conveyed, while keeping a certain amount of the interval.

Further, after the recording sheet is fed, and the sheet reaches the intermediate roller 66, if the drive from the motor UM is switched from the U-turn sheet feeding roller 61 to the intermediate position, the next recording sheet is not fed since the sheet feeding roller 61 is not driven.

Next, a configuration of a control unit according to the present exemplary embodiment will be described in detail. The control unit includes a system control substrate that mainly controls a system of the entire apparatus, a printer control substrate that mainly controls a recording system, a power source unit that supplies power to the apparatus, and an operation control substrate that is equipped with keys of an operation panel and LED.

Figure 7:
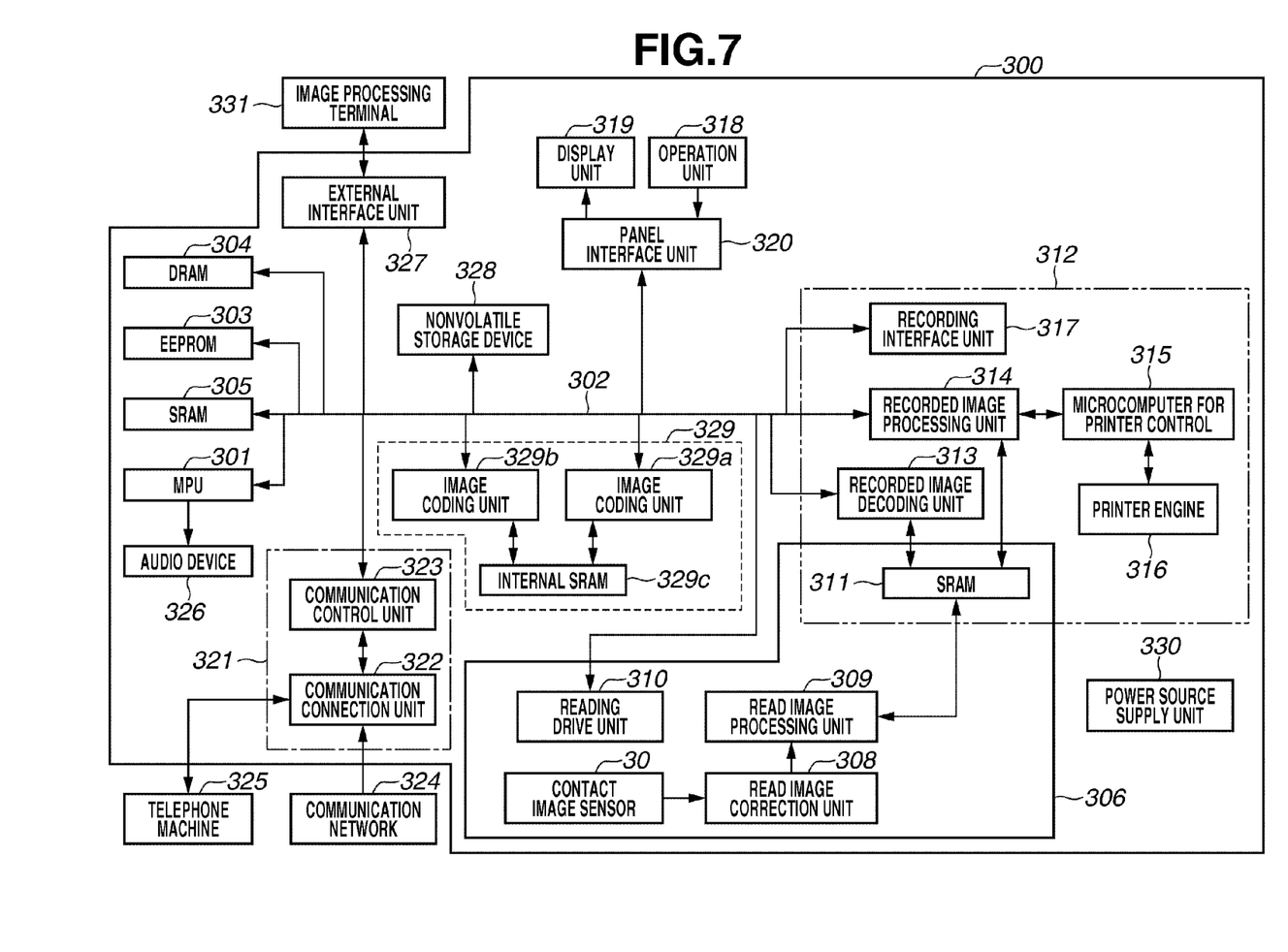
FIG. 7 is a block diagram of the inkjet printer according to an exemplary embodiment of the present invention.

A control configuration of the entire apparatus will be described with reference to a block diagram in FIG. 7. In FIG. 7, a control unit 300 of the entire apparatus includes a microprocessor unit (MPU) 301 that controls the entire apparatus via a system bus 302.

An electronically erasable and programmable read-only memory (EEPROM) 303 stores a program code for operating the MPU 301, initial value data, table data, or an image reading mode table. A dynamic random-access memory (DRAM) 304 is used for an image buffer and an image memory serving as a buffer for temporarily storing data when data transmission/reception is performed with an image processing terminal 331. The DRAM 304 is also used as a memory for accumulating image data received via a communication unit 321 such as image data read out from a reading unit 306, or image data sent from the image processing terminal 331 as a file. A static random-access memory (SRAM) 305 is used as a user registration data area or a work area. The DRAM 304 and the SRAM 305 are protected from accidental failures such as blackout, by using a battery backup.

The reading unit 306 includes the close-contact image sensor 30, a read image correction unit 308, a read image processing unit 309, a reading drive unit 310, a SRAM 311, and so forth. The reading unit 306 drives the reading drive unit 310 to move the close-contact image sensor 30, and optically reads out image data by the close-contact image sensor 30, and converts it into electrical image signals. A shading correction or the like is performed on the signals by the read image correction unit 308. Furthermore, image processing is performed by the read image processing unit 309 to output high-definition image data. The SRAM 311 is used as a buffer when the image processing is performed.

An inkjet type recording unit 312 includes the SRAM 311, a recorded image decoding unit 313, a recorded image processing unit 314, a printer control microcomputer 315, a printer engine 316, a recording interface unit 317, and so forth. The recorded image decoding unit 313 performs data conversion from image data in run-length format into raw image data. The recorded image processing unit 314 converts the raw image data into high-definition image data by carrying out resolution conversion, image processing such as zooming, smoothing, and density correction of images. The SRAM 311 is used as a buffer at the time of these data conversions.

The printer control microcomputer 315 has an MPU that controls each operation of the inkjet type recording unit 312, a ROM that describes various instructions for performing recording control, and a unit that reads out the instructions from the ROM. Furthermore, the printer control microcomputer 315 is provided with a processing unit that processes the instructions read out from the ROM, and a RAM capable of receiving and storing information which the processing unit requires. Further, the printer control microcomputer 315 is also provided with an output unit that outputs signals created by the processing unit. By these units, signals for performing recording control of the printer engine 316 are input and output. The recording interface unit 317 is an interface for establishing cooperation between the printer control microcomputer 315 and the MPU 301.

An operation unit 318 is composed of various key switches such as numeric keypads, and performs inputs of operation instructions and various pieces of information of the apparatus. A display unit 319 is composed of a liquid crystal display (LCD), a light-emitting diode (LED) or the like, and displays statuses of the apparatus. A panel interface unit 320 is an interface for establishing cooperation among the MPU 301 and the operation unit 318 and the display unit 319.

A communication unit 321 includes a communication connection unit 322 such as a line connection device, and a communication control unit 323 such as a modem, and is used to perform line control. A communication network 324, and a telephone machine 325 are connected to the communication connection unit 322. An acoustic device 326 is composed of a speaker or the like, and is used to acoustically notify apparatus users of various statuses.

An external interface unit 327 performs data transmission and reception between the MPU 301 or the like and the image processing terminal 331 to control the apparatus from the image processing terminal 331. A nonvolatile storage device 328 is a mass-storage nonvolatile memory used for storage of the image information and the like, and the information is not erased even when power source is cut off. An image coding/decoding unit 329 is used to perform coding and decoding of image data, and includes an image decoding unit 329a, an image coding unit 329b, and an internal SRAM 329c. A power source unit 330 supplies power to the apparatus. An image processing terminal 331 is a computer or the like connected to the outside.

Operations in the present exemplary embodiment will be described regarding PC scanning operation, copying operation, and printer operation.

(PC Scanning Operation)

Image information of documents read out by the close-contact image sensor 30 of the reading unit 306 undergoes processing such as shading correction or the like by the read image correction unit 308. Further, the image information undergoes binarization and image conversion processing by the read image processing unit 309 and is input into an image coding unit 329b of the image coding/decoding unit 329. The input image data is rasterized in the internal SRAM 329c, compressed and coded by the image coding unit 329b, and is accumulated in the DRAM 304. At the same time management information of the image data is stored in the SRAM 305. Image coded data accumulated in the DRAM 304 is decompressed and decoded by the image decoding unit 329a of the image coding/decoding unit 329, and is rasterized in the internal SRAM 329c as the image data. The rasterized image data passes through the external interface unit 327 and is output to the image processing terminal 331.

(Copying Operation)

The image information of the documents read out by the close-contact image sensor 30 of the reading unit 306 undergoes processing such as shading correction by the read image correction unit 308. After that, the image information further undergoes binarization and image conversion processing by the read image processing unit 309, and is input into the image coding unit 329b of the image coding/decoding unit 329. The input image data is rasterized in the internal SRAM 329c, compressed and coded by the image coding unit 329b, and is accumulated in the DRAM 304. At the same time management information of the image data is stored in the SRAM 305. The image coded data accumulated in the DRAM 304 is decompressed and decoded by the image decoding unit 329a of the image coding/decoding unit 329, and is rasterized in the internal SRAM 329c as the image data. The rasterized image undergoes data correction and image conversion processing by the recorded image processing unit 314, and is printed out on the recording sheet by the printer engine 316 under control of the printer control microcomputer 315.

(Printer Operation)

Command and reception parameter are issued on a byte-by-byte basis from the image processing terminal 331 to the external interface unit 327. The command and reception parameter received by the external interface unit 327 are transferred to a reception buffer of the DRAM 304 on a byte-by-byte basis under control of the MPU 301 in response to an input interrupt signal from the external interface unit 327. In a command, a command code for identifying each command, and size or the like of a succeeding reception parameter are stored. Further, in the reception parameter, setting values and image data necessary for executing an operation in response to each command are stored. The command and the reception parameter except for the image data transferred to the reception buffer are processed by the MPU 301.

In this process, in a case where a content of the reception parameter is the image data, coded data or raw data which constitutes the image data is decompressed and decoded by the image decoding unit 329a of the image coding/decoding unit 329 according to image data format information. The image data format information is indicated by the reception parameter which has been received in advance. Next, the coded data or raw data is rasterized as the image data in the internal SRAM 329c. The rasterized image data is compressed and coded by the image coding unit 329b of the image coding/decoding unit 329. Next, the rasterized image data is accumulated in the DRAM 304, and management information of the image data is stored in the DRAM 304.

After the command has been received, a response and an issuance parameter to the command are generated and issued. The response includes an OK response indicating that the received command was accepted, and a NG response indicating that the received command was not accepted since it was wrong. In addition, there is a BUSY response indicating that the received command cannot be accepted at present for a reason such as an operation is in progress.

Further, in the issuance parameter, a result of transmission or print, an attribute of file or page, apparatus information corresponding to an instructed command, an abort request or retransmission request are stored. The response is set in a transmission buffer of the DRAM 304 by the MPU 301, transferred to the external interface unit 327 on a byte-by-byte basis under control of the MPU 301 according to the input interrupt signals from the external interface unit 327, and subsequently issued to the image processing terminal 331.

Figure 8:
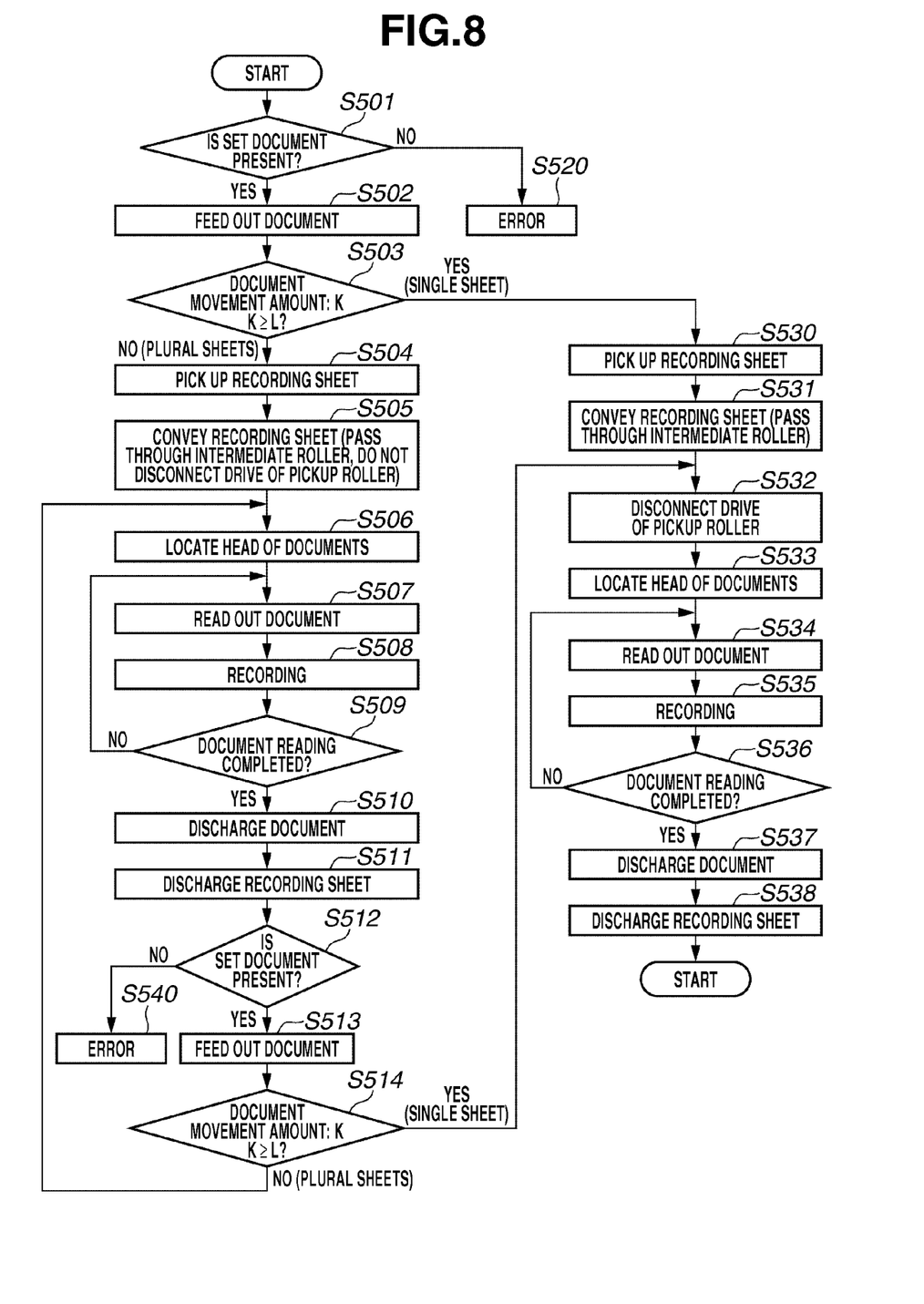
FIG. 8 is a flowchart of reading and recording control of the inkjet printer according to an exemplary embodiment of the present invention.

Next, conveyance operation of documents set in the document conveying and reading apparatus, and recording sheet conveyance when the read image is recorded by the recording device will be described with reference to FIG. 8. First, as illustrated in FIG. 8, when copying operation of the documents is started, in step S501, the document presence/absence sensor 16 detects the presence or absence of the set documents. If the document presence/absence sensor 16 detects absence of the set documents (NO in step S501), the processing proceeds to step S520, where the status of processing becomes error. Since the document S normally abuts on the stopper 20, the document presence/absence sensor 16 detects presence of the documents (YES in step S501), and the processing proceeds to step S502 where feed-out of the document is performed.

In step S503, detection of a movement amount of the lowermost document is performed in the middle of document feeding. The document advances to the nip portion between the separation roller 5 and the separation pad 4 by rotation of the pickup roller 3. The uppermost document S advances as it is by rotation of the separation roller 5, and other documents do not advance ahead of the nip portion due to resistance of the separation pad 4.

Now, a movement amount of the lowermost document detected by the document movement amount detection sensor 50 is denoted as K, and a distance L from a leading edge position of the document regulated by the document stopper 20 to the nip portion 51 between the separation roller 5 and the separation pad 4 is denoted as a threshold value of the movement amount. If the set documents include plural sheets, it becomes K<L, and it is determined that the document being fed is not last one (NO (PLURAL SHEETS) in step S503). Next, the processing proceeds to S504 where a pickup operation of the recording sheet P is performed. Next, the processing proceeds to step S505 where the recording sheet is conveyed up to a position where it passes through the intermediate roller 66. In this process, since a next document is present, a feeding state is maintained as it is without cutting off the drive to the sheet feeding roller 61.

Next, the processing proceeds to step S506. In step 506, the recording sheet is conveyed to the nip portion between the LF roller 67 and the pinch roller 68 by the intermediate roller 66, and starting position of the recording sheet is located to make preparation for the recording. Next, the processing proceeds to step S507. In step S507, the document is read out. Then the processing proceeds to step S508. In step S508, a recording operation is performed. Next, the processing proceeds to step S509. If reading of the document is not completed (NO in S509), the processing returns to step S507. In step S507, this operation is repeated until reading of the documents is completed. In step S509, if reading of the documents is completed (YES in step S509), the processing proceeds to step S510. In step S510, the document is discharged. Then, the processing proceeds to step S511. In step S511, the recording sheet is discharged. Now, copying of the first document is completed.

Next in step S512, the document presence/absence sensor 16 detects the presence or absence of the set documents. If absence of the documents is detected by the document presence/absence sensor 16 (NO in step S512), then the processing proceeds to step S540. In step S540, the status of processing becomes error. If presence of the document is detected by the document presence/absence sensor 16 (YES in step S512), then the processing proceeds to the next step S513. In step S513, feed-out of the document is performed. Then, in the next step S514, similarly to the processing in step S503, a document movement amount is detected. If a value of the document movement amount detection sensor 50 is K<L (NO in step S514), it is determined that the document being conveyed is not the last one, and the processing proceeds to the next step S506.

At this time, since the second sheet is conveyed with a certain interval from the first sheet, the second sheet is located at a position where it has already passed through the intermediate roller. Then, in step S506, the starting position of the recording sheet is located. Until a detection result of the document movement amount becomes K≥L (equal to or greater than a predetermined amount), more specifically, until only one sheet of the set documents is left, the similar processing will be repeated.

Next, a case where a measured value K of the movement amount is equal to or greater than the threshold value in step S503, in other words, one sheet of the set documents satisfies K≥L (YES in step S503) will be described. In this case, the processing proceeds to step S530. In step S530, pickup of the recording sheet P is performed. Next, the processing proceeds to step S531. In step S531, the recording sheet is conveyed to a position where it passes through the intermediate roller 66.

Next, the processing proceeds to step S532. In this process, since there is no following document, more particularly, since it is determined that an image formed on the recording sheet P being fed is the last one, and preparation for recording the next sheet is not necessary, the drive to the sheet feeding roller 61 is cut off to prevent the next recording sheet from being fed.

Next, the processing proceeds to step S533. In step S533, the recording sheet is conveyed to the nip portion between the LF roller 67 and the pinch roller 68 by the intermediate roller 66 to prepare for locating the starting position of the recording sheet and for performing a recording operation. Next the processing proceeds to step S534. In step S534, the document is read out. Then the processing proceeds to step S535. In step S535, recording is performed. Next the processing proceeds to step S536. If reading of the documents is not completed (NO in step S536), the processing returns to step S534, and this operation is repeated until reading of the documents is completed. If reading of the document is completed (YES in step S536), the processing proceeds to step S537. In step S537, the documents are discharged, then the processing proceeds to step S538. In step S538, the recording sheets are discharged.

Next in step S514, a case where K≥L, in other words, only one sheet of the set documents is left (YES in step S514) will be described. In this case, the processing proceeds to step S532. At this time, since the drive to the pickup roller remains transmitted, the recording sheet has been already picked up and conveyed to a position where it has passed through the intermediate roller 66. In this process, since there is no following document, in other words, since preparation for recording a next sheet is not necessary, the drive to the sheet feeding roller 61 is cut off to prevent the next recording sheet from being fed.

Next, the processing proceeds to step S533. In step S533, the recording sheet P is conveyed by the intermediate roller 66 to the nip portion between the LF roller 67 and the pinch roller 68 to prepare for locating the starting position of the recording sheet and performing a recording operation. Thereafter, the processing similar to the one described above is performed until discharge of the recording sheet is performed in step S538.

Thus, according to the present exemplary embodiment, the document conveying and reading apparatus includes a unit that detects presence of the documents set on the document loading portion of the document conveying and reading unit, and a unit that detects a document movement amount at a position opposed to the document feed-out unit relative to the document near the feed-out portion. These detection units determine whether the documents are singular or plural, immediately after the document feed-out operation. When a read out image is recorded by the recording device, a kind of sheet feeding control at the time of recording start can be selected, based on a determination value of singular or plural. According to the present exemplary embodiment, since a plurality of document trailing edge detection sensors is not necessary, and a long document loading tray is not necessary either, it is possible to provide an image reading and forming apparatus that can be produced at low cost and does not need to increase its size. Furthermore, whether documents other than standard form sizes are singular or plural, can be also determined immediately after sheet feeding operation without delay in detection time. As a result, the image reading and forming apparatus according to the present exemplary embodiment is also effective in improvement of copying productivity.

In the above-described the exemplary embodiment, the last document is determined by providing the document movement amount detection sensor 50 in the device that feeds the documents. The exemplary embodiment is not limited thereto, but it can be also applied to a device that supplies a stack of sheets other than documents. For example, a rotating member similar to that in the document movement amount detection sensor 50 may be provided in contact with a surface on a side opposite to a surface which the pickup roller 3 serving as the sheet feeding unit contacts, and the last document may be detected by an encoder or the like which detects rotation of the rotating member.

Further, the exemplary embodiment is not limited to a contact type motion sensor as described above, but an optical non-contact type motion sensor that detects a movement of a surface of a sheet in a non-contact manner may be used. As an example of the non-contact type motion sensor, there is a direct sensor which captures an image of a portion of a sheet surface by an image sensor to acquire image data at a plurality of timings. The direct sensor analyzes the acquired image data to detect a position change of irregularities of fiber or the like, thereby determining a movement amount of the sheet. As another example, there is a Doppler speed meter which exposes a surface of a sheet to a laser beam and directly detects a movement of the sheet. In this manner, by using a detection unit that can obtain a movement amount from the surface instead of edge of the sheet, it is possible to determine whether the sheet is a last sheet immediately after feeding start, regardless of a size of the sheet.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-090370 filed Apr. 14, 2011, which is hereby incorporated by reference herein in its entirety.

What is claimed is:

1. A document reading and recording apparatus comprising:
   a document feeding unit configured to feed at least one document from documents set on a mounting portion;
   a reading unit configured to read an image of a document fed by the document feeding unit;
   a sheet feeding roller configured to feed at least one sheet to be recorded;
   a recording unit configured to record an image, according to image information, read by the reading unit, on a sheet fed by the sheet feeding roller;
   a detection unit configured to detect, from a side opposite to the document feeding unit, a document movement amount with respect to a lowermost sheet of the set documents on the side opposite to the document feeding unit; and
   a control unit configured to stop feeding sheets, by the sheet feeding roller, based on detection by the detection unit.

2. The document reading and recording apparatus according to claim 1, wherein when a document is fed by the document feeding unit, if a movement amount detected by the detection unit is greater than or equal to a predetermined amount, feeding by the sheet feeding roller is stopped.

3. The document reading and recording apparatus according to claim 1, wherein when a document is fed by the document feeding unit, if a movement amount detected by the detection unit is less than a predetermined amount, a next sheet to be recorded is fed by the sheet feeding roller.

4. The document reading and recording apparatus according to claim 1, wherein when a document is fed by the document feeding unit, if a movement amount detected by the detection unit is less than a predetermined amount, a next sheet to be recorded is fed without stopping the sheet feeding roller.

5. The document reading and recording apparatus according to claim 1 further comprising:
 a transmission unit configured to transmit drive to the sheet feeding roller, wherein the transmission unit includes an overrunning mechanism configured to permit the sheet feeding roller to rotate faster than a rotation caused by the drive transmitted to the sheet feeding roller; and
 a conveyance roller provided on a downstream side in a conveyance direction of the sheet feeding roller, wherein the conveyance roller is configured to convey a sheet to be recorded fed by the sheet feeding roller at a speed faster than the sheet feeding roller,
 wherein when the document movement amount detected by the detection unit is less than a predetermined amount, the transmission unit continues to transmit the drive so that the sheet feeding roller feeds a next sheet to be recorded.

6. The document reading and recording apparatus according to claim 1, further comprising:
 a rotating member that contacts a surface of a lowermost sheet of stacked documents, and a feeding roller for feeding the stacked documents provided at a position opposite to a position of the rotating member,
 wherein the detection unit detects the document movement amount based on rotation of the rotating member.

7. A document reading and recording apparatus comprising:
 a sheet feeding roller configured to feed loaded sheets to be recorded;
 a transmission unit configured to transmit drive to the sheet feeding roller, wherein the transmission unit includes an overrunning mechanism configured to permit the sheet feeding roller to rotate faster than a rotation caused by the drive transmitted to the sheet feeding roller;
 a conveyance roller provided on a downstream side in a conveyance direction of the sheet feeding roller, wherein the conveyance roller is configured to convey a sheet to be recorded, being fed by the sheet feeding roller at a speed faster than the sheet feeding roller;
 a document feeding roller configured to feed loaded documents;
 a reading unit configured to read an image of a document fed by the document feeding roller;
 a recording unit configured to record an image, according to image information, read by the reading unit, on a sheet fed by the sheet feeding roller; and
 a detection unit configured to detect a document movement, wherein, based on a detection result of the detection unit, it is determined whether a document being fed is a last document from among loaded documents, wherein, the sheet feeding roller is stopped if the document being fed is the last document, and a next sheet to be recorded is fed if the document being fed is not the last document.

8. The document reading and recording apparatus according to claim 7, wherein the overrunning mechanism includes a first engaging portion, which is formed in a rotating member on a drive side, and a second engaging portion, which is engaged with the first engaging portion and formed in the rotating member on a driven side, and the overrunning mechanism transmits the drive by engaging the first engaging portion with the second engaging portion.

9. A sheet feeding apparatus comprising:
 a sheet feeding roller configured to feed loaded sheets;
 a transmission unit configured to transmit drive from a driving source to the sheet feeding roller, wherein the transmission unit includes an overrunning mechanism configured to permit the sheet feeding roller to rotate faster than a rotation caused by the drive transmitted to the sheet feeding roller; and
 a conveyance roller provided on a downstream side in a conveyance direction of the sheet feeding roller, wherein the conveyance roller is configured to convey a sheet fed by the sheet feeding roller at a speed faster than the sheet feeding roller while the overrunning mechanism causes the sheet feeding roller to run idle,
 wherein the sheet feeding roller and the conveyance roller feed sheets successively and at intervals while a driving source continuously drives the transmission unit, and
 wherein feeding sheets is terminated by cutting off transmission of the drive to the sheet feeding roller before a trailing edge of the sheet being conveyed by the conveyance roller passes through the sheet feeding roller.

* * * * *